March 17, 1959 W. B. BUCK 2,877,822
HYDRAULICALLY OPERABLE RECIPROCATING MOTOR DRIVEN
SWAGE FOR RESTORING COLLAPSED PIPE
Filed Aug. 24, 1953 4 Sheets-Sheet 1
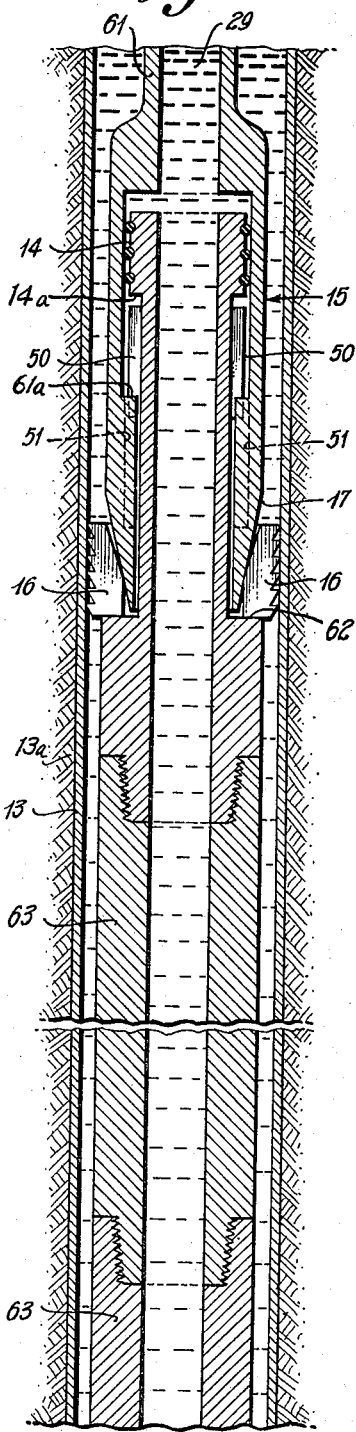
Fig. 1<sup>a</sup>
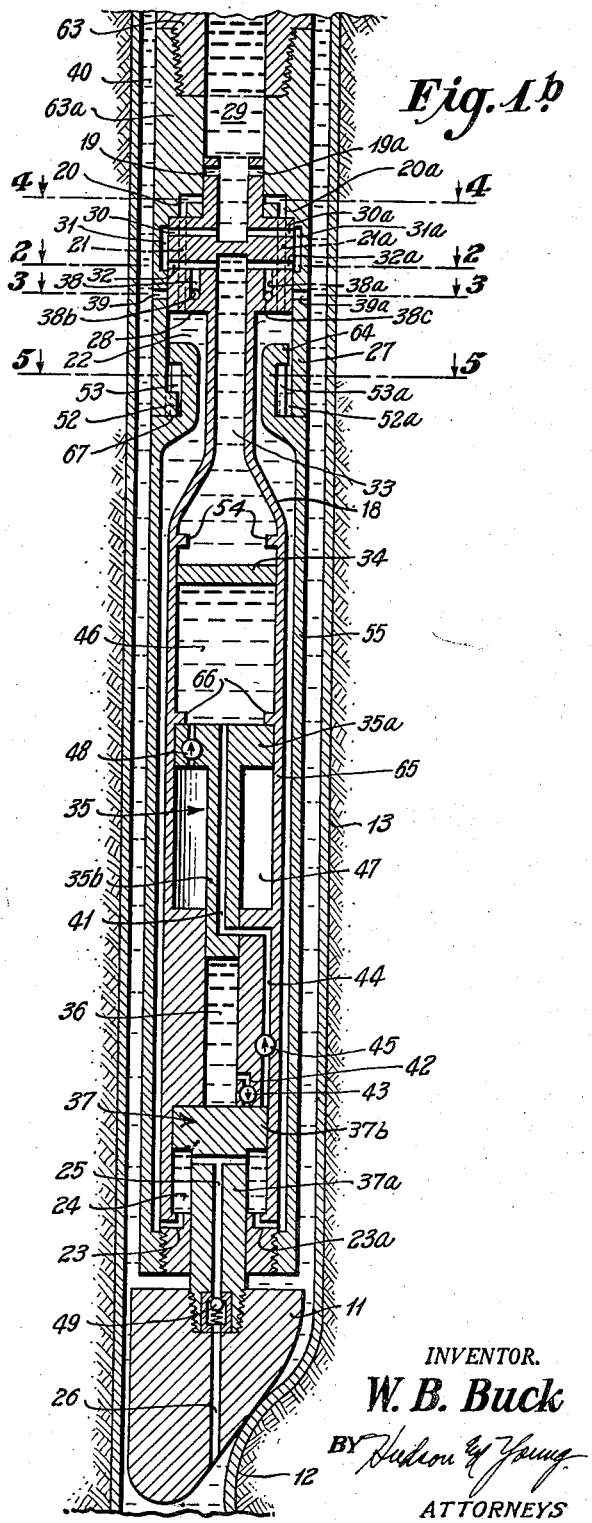
Fig. 1<sup>b</sup>
INVENTOR.
W. B. Buck
BY
ATTORNEYS INVENTOR.
W. B. Buck
ATTORNEYS March 17, 1959
W. B. BUCK
2,877,822
HYDRAULICALLY OPERABLE RECIPROCATING MOTOR DRIVEN
SWAGE FOR RESTORING COLLAPSED PIPE
Filed Aug. 24, 1953
4 Sheets-Sheet 3
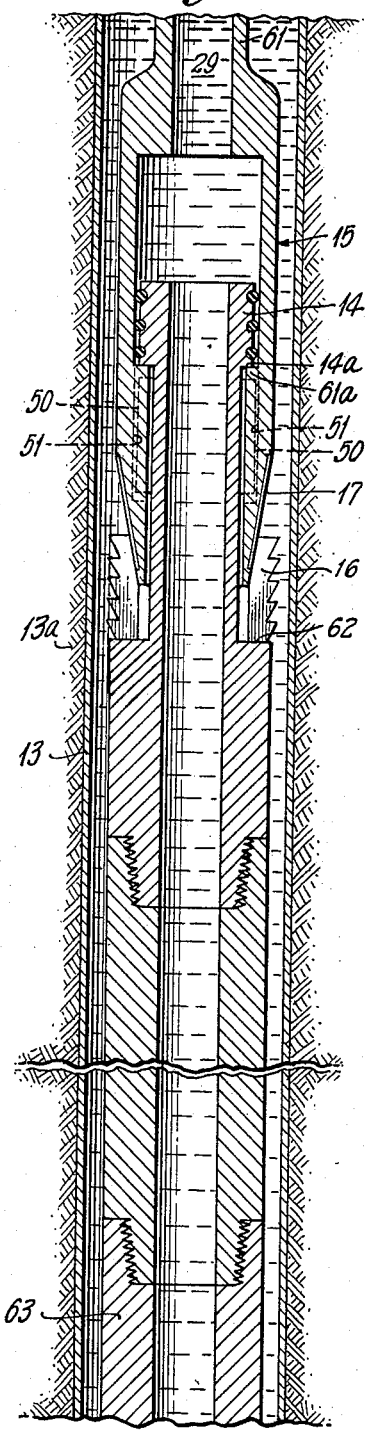
Fig. 6ª
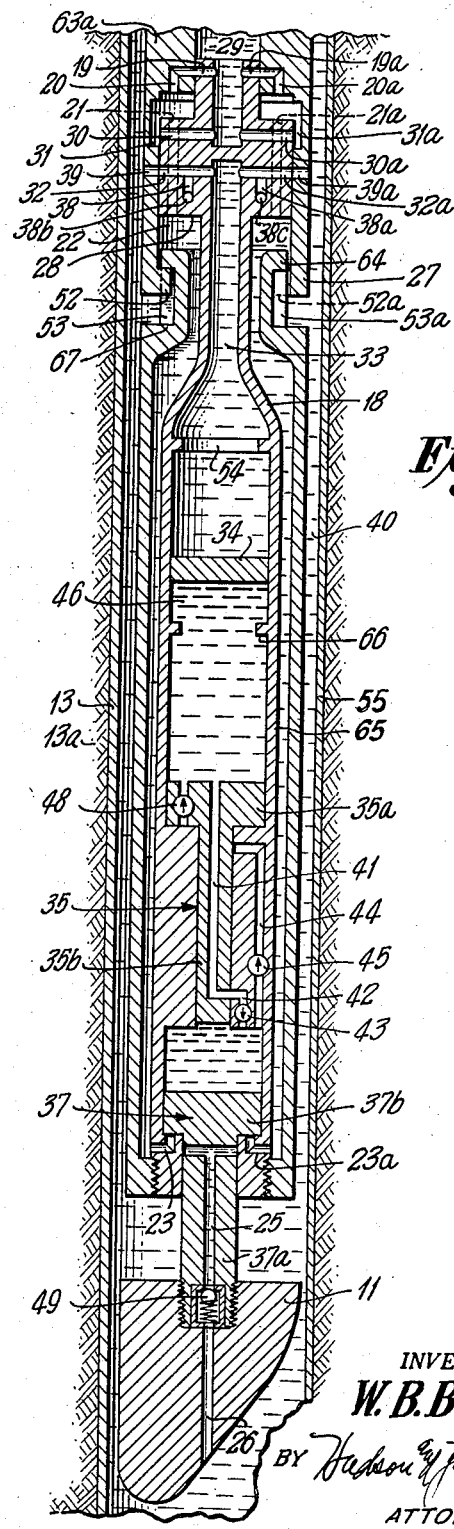
Fig. 6ᵇ
INVENTOR.
W. B. Buck
BY Hudson & Young
ATTORNEYS March 17, 1959 W. B. BUCK 2,877,822
HYDRAULICALLY OPERABLE RECIPROCATING MOTOR DRIVEN
SWAGE FOR RESTORING COLLAPSED PIPE
Filed Aug. 24, 1953 4 Sheets-Sheet 4

INVENTOR.
W.B. BUCK
BY *Hudson & Young*

ATTORNEYS

United States Patent Office 2,877,822
Patented Mar. 17, 1959

2,877,822

HYDRAULICALLY OPERABLE RECIPROCATING MOTOR DRIVEN SWAGE FOR RESTORING COLLAPSED PIPE

William B. Buck, Oklahoma City, Okla., assignor to Phillips Petroleum Company, a corporation of Delaware Application August 24, 1953, Serial No. 376,121

6 Claims. (Cl. 153—80.5)

This invention relates to power driven pipe swages. In one aspect it relates to hydraulic power driven pipe swages. In another aspect it relates to a hydraulic power driven casing swage.

One object of my invention is to provide a pipe expanding swage operated by hydraulic power for restoring partly or fully collapsed and out-of-round pipe.

Another object of my invention is to provide a hydraulic power driven swage for restoring collapsed or partly collapsed well casing.

Still another object of my invention is to provide a hydraulic power driven casing swage for restoring collapsed or partly collapsed well casing in a well.

Yet another object of my invention is to devise such a casing swage which will be easy to operate in a deep well from the surface.

Still other objects and advantages will be realized by those skilled in the art upon reading the following disclosure which taken with the attached drawing forms a part of this specification.

In the drawing Figure 1a is an elevational sectional view of a portion of my apparatus.

Figure 1b is an elevational view of another portion of my apparatus, the apparatus of Figure 1b being a continuation of the apparatus of Figure 1a.

Figure 6a is an elevational view, in section, of the portion of apparatus illustrated in Figure 1a, while being lowered in a well.

Figure 6b is an elevational view, in section, of the portion of apparatus illustrated in Figure 1b, while being lowered in a well.

Figure 2:
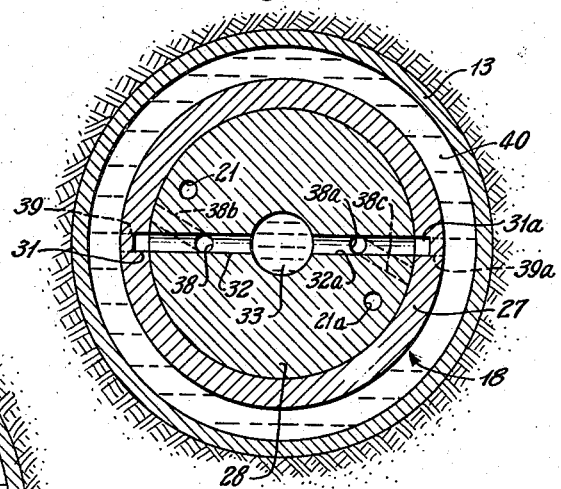
Figure 2 is a cross-sectional view of the apparatus of Figure 1b taken on the line 2—2.

My casing swage comprises an elongated member adapted to be lowered down a well casing to a portion of casing to be restored. A power liquid, such as a drilling mud, forces a free floating piston downward which free floating piston in turn forces an oil against a second piston. To the bottom side of this second piston is attached a piston of smaller diameter than that of the second piston and this smaller diameter piston is disposed operatively in a correspondingly small diameter cylinder which is filled with oil similar to that immediately under the floating piston. The use of this second piston and the small diameter piston exerts a mechanical advantage against a third piston which is directly attached to the pipe expanding swage element. Slips are provided near the upper end of the apparatus to prevent the assembly from moving upward during the time the swage is being forced into a collapsed section of pipe. At the end of a downward stroke of the swage upon rotating the apparatus at the surface of the ground the body of the apparatus is lowered while the swage and the several pistons do not move downward because the swage rests against a collapsed section of casing. This lowering of the apparatus is assisted by the weight of the apparatus.

Referring now to the drawing and specifically to Fig. 1a. Element 13 is a well casing disposed in a well 13a. The lower end of casing 13 is illustrated in Figure 1b as being collapsed, the collapsed section being identified by reference numeral 12. The upper end of a slip expanding member 61 is attached to a joint of well tubing, not shown. At the bottom end of slip expanding member 61 is a slip setting assembly 15. A connector 14 with shoulder 62 and lugs 50 connects the slip expanding member 61 with a tube section 63 as shown. Slips 16 are dovetailed to a cone 17 on the lower end of the slip setting assembly 15 in a conventional manner. Teeth on slips 16 are so shaped as to resist upward movement of my swage apparatus when setting assembly 15 is at the lower end of its extent of movement. Sliding contact is maintained between the slip setting assembly 15 and the connector 14 by the lugs 50 on connector 14 and slots 51 in the slip setting assembly 15. These slots and lugs are intended to permit vertical movement of slip setting assembly 15 with respect to connector 14 and at the same time connector 14 can be rotated by rotation of the slip setting assembly 15 at any time the slips are not set. Rotation stops 52 and 52a are provided for lugs 53 and 53a (see Figures 1b and 5) to limit rotation through an angle slightly less than 180°. The utility and operation of these rotation stops and lugs will be fully described hereinbelow. Tube sections 63 are heavy walled sections as illustrated in Figures 1a, 1b, 6a and 6b for providing weight and compressive strength to my apparatus and at the same time providing distance between a collapsed section of pipe at which swage 11 is operating and an undamaged section of casing to which slips 16 can be effectively set.

The apparatus of Figure 1b is an extension of the apparatus of Figure 1a, the former being attached to the bottom of the apparatus of Figure 1a.

Figure 3:
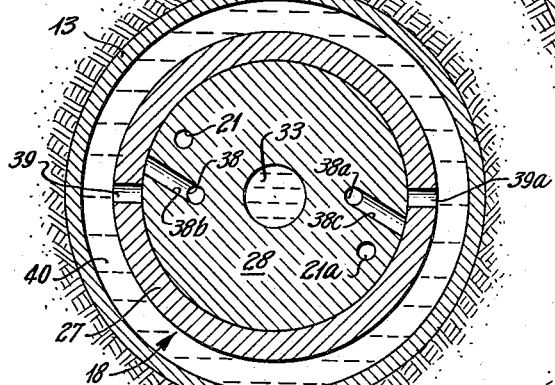
Figure 3 is a cross-sectional view of the apparatus of Figure 1b taken on the line 3—3.
Figure 4:
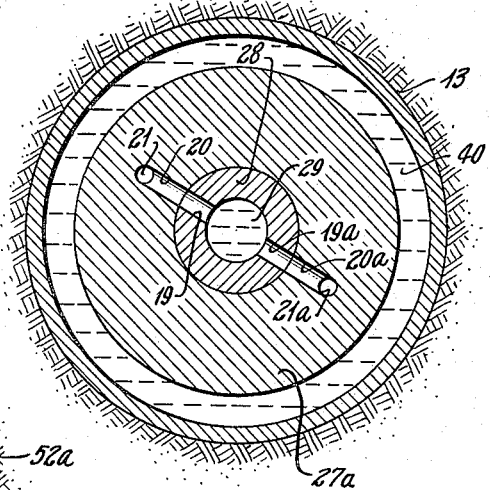
Figure 4 is a cross-sectional view of the apparatus of Figure 1b taken on the line 4—4.

In Figure 1b a conduit 29 is a continuation of conduit 29 from Figure 1a, which in turn is a continuation of the conduit in the tubing string not shown, extending from the surface to my swage apparatus. The lower end of this conduit 29 terminates within a valve housing 27. The outer wall of valve housing 27 extends downward and terminates as an annular ring provided with the rotation stops 52 and 52a. These stops operate in conjunction with the lugs 53 and 53a provided at the upper end 64 of the outer shell 55. Valve housing 27 is intended to be lifted or raised under certain conditions and the distance of travel is limited by the spacing between the top of the rotation stops 52 and 52a and the bottom of the upper end 64 of the outer shell 55. An inner shell 65 inside outer shell 55 extends from a level which is above that of the swage 11 to a level within valve housing 27. The uppermost end of the inner shell 65 contains ports 19 and 19a. A short distance below these ports are ports 30 and 30a. Below ports 30 and 30a are another pair of ports 32 and 32a which are in substantially the same vertical plane as are ports 30 and 30a. From ports 32 and 32a ports 38 and 38a, respectively, extend downward and communicate respectively with ports 38b and 38c. Ports 38b and 38c may best be seen in Figures 2 and 3. When valve housing 27 is in its lowest position with respect to outer shell 55 a slot 31 in the wall of valve housing 27 connects ports 30 and 32. Also slot 31a connects ports 30a and 32a. A pair of ports 39 and 39a are provided in the wall of valve housing 27 as shown. These latter two ports are intended to be aligned with ports 38c and 38b, respectively, when valve housing 27 is rotated from the position illustrated in Figure 5 to such a point that rotation stop 52 is in contact with lug 53a.

When valve housing 27 is in its raised position with respect to outer shell 55 ports 19 and 19a are intended to be aligned respectively with ports 20 and 20a. Ports 20 and 20a are also connected with vertical ports 21 and 21a, respectively so that mud can flow from conduit 29 through ports 19, 20 and 21 and through ports 19a, 20a and 21a into an annular space 22.

When valve housing 27 is in its raised position with respect to shell 55 slot 31 is intended to disconnect ports 30 and 32 and slot 31a is likewise intended to disconnect ports 30a and 32a. Relative to these latter mentioned ports it is intended when valve housing 27 is in the position illustrated in Figure 1b, that is, valve housing 27 is lowered, that fluid from conduit 29 can flow freely through port 30, slot 31 and port 32, and through port 30a, slot 31a and port 32a into the space 33. It is also intended that when valve housing 27 is in a raised position with respect to the upper portion 28 of inner shell 65 fluid from conduit 29 cannot follow the above described paths but fluid from space 33 can flow through ports 32 and 39a (Figure 2), into the annulus 40 between the casing and my swage apparatus. At the same time fluid can also flow from space 33 through port 32a and port 39 (Figure 2) into the annulus 40. Fluid from space 33 flows through these ports into annulus 40 at such time as when the swage apparatus is resting on a collapsed section of casing 12 and valve housing 27 has been raised and rotated as above mentioned. Under these conditions the piston assembly 37 to be described hereinbelow is forced upward in respect to inner shell 65 and the fluid from space 33 vents into the annulus 40.

When valve housing 27 is rotated clockwise until stop 52 reaches lug 53 (Figure 5) and is raised until rotation stops 52 and 52a contact the underside of the upper end 64 of the outer shell 55, port 19 is then aligned with port 20 and mud from conduit 29 can flow through ports 19, 20 and 21 into the annular space 22 and downward through this annular space to ports 23 and 23a into a cylinder 24 below a piston 37. At the same time mud also flows from conduit 29 through ports 19a, 20a and 21a through annulus 22 and through ports 23 and 23a into the aforementioned cylinder 24. From cylinder 24 the mud flows by way of port 25, pop valve 49 and leaves my apparatus by way of conduit 26 for passage upward through annulus 40 for return to the well head, not shown, to complete the mud circuit. The relative positioning of the apparatus parts, ports and conduits just described is illustrated in Figures 6a and 6b of the drawing. This latter arrangement of apparatus parts is intended to function as mentioned when my swage apparatus is being lowered down a well casing and before it reaches a constricted portion upon which the swage 11 would rest.

The inner shell 65 is composed of several parts as follows: The upper portion of this inner shell provides the aforementioned space 33, a cylinder 46 whose wall is provided with stops 66 and stops 54. Stops 66 prevent piston 35 from moving too far upward and stops 54 prevent the floating piston 34 from reaching cone 18. A cylinder 47 is provided below stops 66 and has the same diameter as cylinder 46. Communicating with cylinder 47 is a small diameter cylinder 36 which also communicates with another larger diameter cylinder 24. Within cylinder 46 is a free floating piston 34 as shown in Figures 1b and 6b. In cylinder 47 is shown a piston 35 which includes a large diameter section and a small diameter section 35a and 35b, respectively. In cylinder 24 is provided a piston 37 having a small diameter end 37a and a large diameter end 37b. To the bottom of the small diameter piston end 37a is attached the aforementioned swage 11. The free floating piston 34 is intended to separate the drilling mud in space 33 with its suspended solid matter from an oil in cylinder 46. Cylinders 46 and 36 are intended to be filled with oil to provide proper lubrication for the moving parts and transmit operating pressure while cylinder 47 is void or empty or liquid. Piston 34 and the large diameter piston ends 35a and 37b are intended to be provided with liquid seals, such as piston rings, not shown, or conventional constructions. The small piston ends 35b and 37a are also provided with sealing rings. Leakage past the large diameter piston end 35a from cylinder 46 and past the small diameter end piston 35b from cylinder 36 into cylinder 47 will be forced through check valve 48 when the swage apparatus is lifted and mud circulation is stopped. When oil leaks into cylinder 36 from any place whatever and piston 35 is at the upper end of its stroke, piston 37 will force the excess oil through a check valve 45 in conduit 44 and through port 41 into cylinder 46. When the piston 35 is at the lower end of its stroke, at which time conduit 41 is aligned with port 42 containing a check valve 43 fluid can flow from cylinder 46 through ports 41 and 42 into the cylinder 24 above piston 37.

Port 25 and the pop valve 49 are contained within the small diameter end 37a of piston 37, the small diameter end 37a being attached to the swage 11 containing a conduit 26 in alignment with port 25.

When it is desired to carry out a well casing expanding operation the swage assembly of my apparatus is run into the casing on the end of a string of tubing as hereinbefore described. The cylinders 46 and 36 are filled with oil which possesses at least some lubricating properties. During the running operation the valve housing 27 is in its raised position with respect to the upper portion 28 of the inner shell 65 and as mentioned above free passages are formed through ports 19, 20 and 21 and through ports 19a, 20a and 21a so that drilling mud can be pumped therethrough and down the annular space between shell 55 and 65 through ports 23, 23a, 25 and conduit 26. From conduit 26 the drilling fluid enters the well casing and rises in the annulus 40 to complete its circulation. This circulation can be continued during the entire swage running operation, that is, while the apparatus is being lowered down the casing to the caved-in section, if desired. When the swage 11 reaches caved-in section 12 of the casing the lower end of inner shell 65, surrounding piston rod 37a, and the screw threaded connection between said inner shell 65 and outer shell 55 continue to move downwardly from their Figure 6b to their Figure 1b position, while the valve housing 27 moves downward until the lower end of the valve housing 27 seats against a shoulder 67 and at this time ports 19 and 19a are no longer aligned with ports 20 and 20a, respectively, and mud cannot be circulated as above explained. The apparatus is now ready for a pipe expanding operation. This expanding operation is carried out by exerting pressure from the surface of the ground by way of the column of mud in conduit 29 and mud tends to flow from space 29 through port 30, slot 31 and port 32 and through port 30a, slot 31a and port 32a into space 33. Mud pressure is then exerted on the floating piston 34 which in turn exerts pressure on the oil in space 46. This oil in space 46 transmits pressure to the upper side of the large diameter end 35a of piston 35 and the total force exerted on this upper side of piston end 35a is transmitted to the lower surface of the small diameter piston end 35b. This mechanical advantage greatly increases the pressure per square inch on the oil in the cylinder 36 which increased pressure is exerted against the upper face of piston 37. In this manner a very great pushing force is exerted against the swage 11. If needed, this force is increased by increasing the pressure from the mud pump until such a force is reached that swage 11 is forced downward to open the constricted section 12 of the casing.

When piston 37 has reached its lower limit of travel, or has been stalled against further movement at a point short of a full stroke, the piston is retracted as follows: member 61 is elevated, by raising the supporting tubing string at the surface, an amount sufficient to fully retract the slips 16 and to elevate the valve housing 27 until stops 52, 52a contact annular member 64. At this position, ports 19, 19a register respectively with ports 20, 20a and ports 32, 32a register respectively with ports 39, 39a. By pumping fluid into conduit 29, the fluid will travel through port 19, port 20, vertical port 21, annular space 22 to duct 23 where it will force piston 37 upward in cylinder 24. Oil above piston 37 forces piston 35b up which in turn forces oil in space 46 and thereby piston 34 up. Mud fluid trapped in space 33 is vented through ports 32 and 39 and through ports 32a and 39a to annular space 40 where it is returned to the surface. The tubing string is then lowered and the swaging operation may be repeated as necessary.

During the time that the swage 11 is being forced downward to open a constricted section of casing the teeth on the slips 16 are intended to be forced by cone 17 into rigid contact with the casing 13 to such a degree that the entire apparatus cannot be lifted upward. The weight of the tubing length, not shown, tending to force cone 17 against slips 16 provides a relatively positive contact between slips 16 and the casing with respect to upward movement of the slips. The slips 16 are dovetailed to cone 17 in such a manner that the slips can move parallel to the slope direction of the conical surface of cone 17 but still cannot become detached therefrom. Whenever it is desired to rotate the apparatus, cone 17 is first elevated to loosen the slips.

It is possible that under some conditions there may be some leakage of oil downward past piston 37. This leakage will have the effect of reducing the length of stroke of piston 37 since cylinder 36 will not be full of oil at the beginning of the next downstroke. This condition can be remedied by picking up the tool at the end of the downstroke without pumping the power fluid. Piston 35 will be at the lower end of its stroke and port 41 will be aligned with port 42 containing the check valve 43 which allows fluid to pass in a downward direction only. Oil can then flow through ports 41 and 42 to cylinder 24 above piston 37 to fill this space with oil.

At any time it is desired to stop the action of the tool, it is merely necessary to raise slip setting assembly 15 to free slips 16 and then to rotate all the assembly down to and including the valve housing 27 in a counterclockwise direction until stops 52 and 52a contact respectively lugs 53a and 53 at which time ports 38b and 38c are aligned respectively with ports 39a and 39 thereby allowing exhaust of drilling mud from space 33 into annulus 40 between my apparatus and the well casing 13. The tool can then be lowered by gravity or without this latter rotation the tool is lowered as described hereinbefore, for another casing expanding operation.

The adjustable pop valve 49 is provided for use in wells in which it is impossible to get drilling fluid circulation, the difference in pressure across this valve being equal to that caused by the difference in liquid level in the tubing and the casing.

Figure 5:
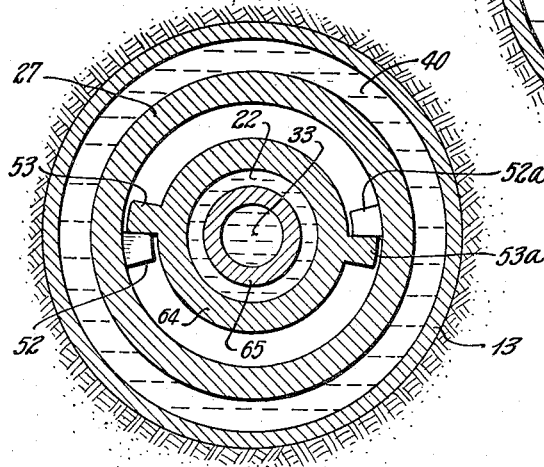
Figure 5 is a cross-sectional view of the apparatus of Figure 1b taken on the line 5—5.
Figure 7:
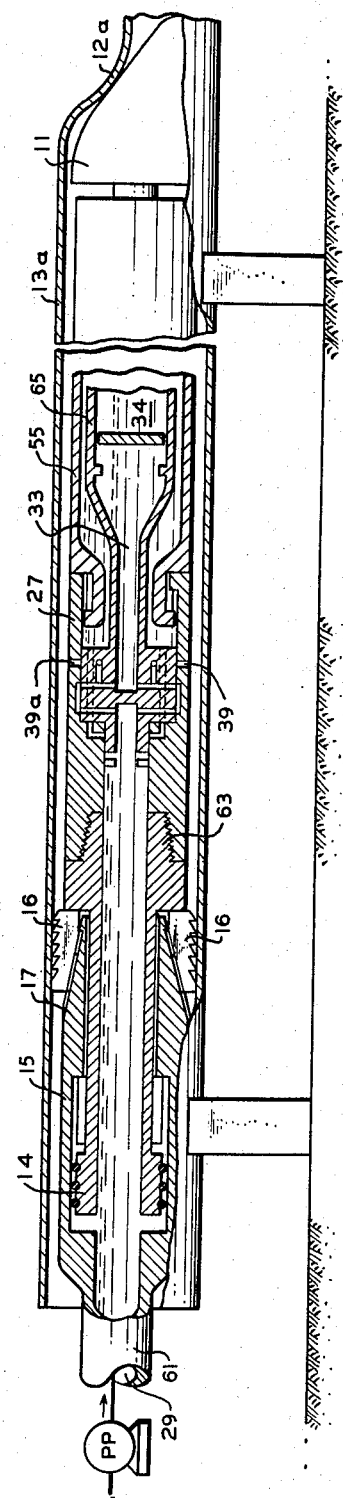
Figure 7 is a view, partly in section, of the apparatus for expanding collapsed pipe on the surface of the ground when lying horizontally.

It will be obvious from an inspection of Figure 5 that the degree of rotation of valve housing 27 is some less than 180°.

It will be seen that the force applied to the small diameter end 35b of piston 35 will be multiplied before it reaches swage 11. This increased force, accompanied by a reduced stroke, is controlled by the relative upper area of the large diameter piston end 35a and the area of the lower surface of the small diameter piston end 35b. This mechanical advantage is not controlled by the diameter of the small end 37a of piston 37 but this piston end 37a is made sufficiently large to withstand the desired downward thrust against swage 11.

The apparatus of my invention may be used to straighten or expand collapsed casing in a well or it may be used to straighten pipe on the surface of the ground even with the pipe lying horizontally. In this latter case there will be no circulating drilling fluid and it will be merely necessary to insert the tool to the constricted portion 12a of a pipe 13a and make certain that the slips 16 are set and then apply fluid pressure to conduit 29 and thence to the arrangement of pistons. When the swage 11 has reached the lower end of its stroke it may be retracted merely by loosening the slips then rotating the valve housing 27 counterclockwise and pushing by any means whatever, as by hand, the entire assembly toward the swage 11 under which condition a portion of the fluid in space 33 will be vented. When the swage has been fully retracted the valve housing 27 will then be rotated in a clockwise direction, the slips reset, and the apparatus is then ready for another power stroke.

It is intended that such elements, as inner shell 65, can be constructed of one or more parts, for purposes of manufacture, assembly and disassembly. Element 65 is illustrated in the drawing as one inner shell merely for purposes of simplicity.

Materials of construction should be selected from among those commercially available taking into consideration strength of materials, corrosion, etc.

While certain embodiments of the invention have been described for illustrative purposes, the invention obviously is not limited thereto.

Having disclosed my invention, I claim:

1. A device for expanding collapsed well casing in a well comprising, in combination, an elongated body member disposed in a casing in a well, a first cylinder and a second cylinder connected by a third cylinder of smaller diameter than the first and second cylinders, said first cylinder being disposed above said second cylinder, said cylinders being disposed in said body member and along the axis and near the bottom thereof, a first piston having a large diameter end disposed operatively in said first cylinder and a small diameter end disposed operatively in said third cylinder, said small diameter end of said first piston being shorter axially than the axial length of said third cylinder, a second piston having a large diameter end disposed operatively in said second cylinder and a small diameter end extending slidably through the end wall of said second cylinder opposite said third cylinder, a swage attached operatively to the end of said second piston extending through said end wall and disposed below the bottom end of said body member for expanding collapsed well casing, a first conduit in said body member leading from a level near the top end thereof to the adjacent end of said first cylinder for passage of power liquid, said first conduit having a containing wall, said containing wall being a portion of said body member, a second conduit leading from a source of power liquid down the well to a level near the adjacent end of said first conduit for passage of power liquid, said second conduit having a containing wall and a portion of said wall surrounding and extending to a level below the adjacent end of the wall of said first conduit, a slot in said portion of wall communicating said first and second conduits for passage of power liquid, and means between the uncollapsed wall of said pipe and the wall of said second conduit above the upper end of said body member for holding said device against vertical slippage movement.

2. In the device of claim 1, said portion of wall surrounding and extending to said level below the adjacent end of the wall of said first conduit being axially slidable over said adjacent end of said wall of said first conduit, said slot being so positioned in said portion of wall as to provide communication from said second conduit to said first conduit when said portion of wall is at the lowest end of its extent of axial movement.

3. In the device of claim 2, a first port in said portion of wall, said port being so positioned as to provide communication between said first conduit and the exterior of said body member when said portion of wall is at its upper end of its extent of axial movement.

4. In the device of claim 3, a second port in the wall of said second conduit, an annular member attached to the upper end of said body member and extending into the lower portion of said second conduit, a third port in said annular member, a fourth port in the upper wall of said first conduit, the axis of said fourth port being disposed axially with respect to said body member, said fourth port communicating with an annular space around said cylinders and substantially the length of said body member, a fifth port in the end wall of said second cylinder communicating said annular space with the portion of said second cylinder below the large diameter end of said second piston, said third port being adapted to communicate by way of said second port, said fourth port, said annular space and said fifth port with the second cylinder on the side of the large end of said second piston adjacent said end wall of said second cylinder when said portion of wall is at its upper end of its extent of axial movement for passage of power liquid from said second conduit to said second cylinder to retract said second piston and the attached swage.

5. In the device of claim 1, wherein said wall of said second conduit is rotatable with respect to said body member, a first port in the upper wall of said first conduit and communicating therewith, a second port in said portion of wall surrounding and extending to said level below the adjacent end of the wall of said first conduit, said first and second ports being so disposed as to provide communication from said first conduit to the exterior of said device upon rotation of said portion of wall to such an extent that said second port communicates with said first port when said portion of wall is at the lowest end of its extent of axial movement.

6. A hydraulic motor driven swage apparatus for restoring collapsed pipe comprising, in combination, an elongated body member, a first conduit for passage of a hydraulic liquid from a source to the adjacent end of said body member, first and second cylinders connected by a third cylinder of smaller diameter than the diameters of said first and second cylinders, said second cylinder being adjacent the other end of said body member, said cylinders being disposed along the axis of said body member, a first piston having a large diameter end disposed operatively in said first cylinder and a small diameter end disposed operatively in said third cylinder, the small diameter end of said first piston being shorter than the axial length of said third cylinder, a second piston having a large diameter end disposed operatively in said second cylinder and a small diameter end extending slidably through the end wall of said second cylinder opposite said third cylinder, a pipe restoring swage attached operatively to the end of said second piston extending through said end wall, said swage being adapted to be forced by said second piston axially into the collapsed pipe, a second conduit in said body member extending from said adjacent end to said first cylinder, said first and second conduits having separate containing walls, a portion of the containing wall of said first conduit extending beyond the end of said first conduit and surrounding rotatably, axially and slidably the adjacent end of the containing wall of said second conduit, a slot in the inner surface of said portion of wall communicating said second conduit with said first conduit when said portion of wall is at the end of its axial movement nearest said swage for passage of power liquid from said source to said second conduit, and means between the uncollapsed wall of pipe and the wall of said first conduit for holding the apparatus against slippage away from said swage upon pressuring said swage into a collapsed section of pipe.

References Cited in the file of this patent
UNITED STATES PATENTS

| | | |
|---|---|---|
| 489,950 | Harrington | Jan. 17, 1893 |
| 1,166,040 | Burlingham | Dec. 28, 1915 |
| 1,304,954 | Foster | May 27, 1919 |
| 1,313,284 | Foster | Aug. 19, 1919 |
| 1,494,128 | Primrose | May 13, 1924 |
| 1,683,629 | Robinson | Sept. 11, 1928 |
| 1,738,860 | Wigle | Dec. 10, 1929 |
| 1,747,606 | Steiner | Feb. 18, 1930 |
| 1,804,700 | Maxwell | May 12, 1931 |
| 1,837,690 | Sunde | Dec. 22, 1931 |
| 1,983,287 | Grinnell | Dec. 4, 1934 |
| 2,237,538 | Zublin | Apr. 8, 1941 |
| 2,345,739 | Fisher | Apr. 4, 1944 |
| 2,506,657 | Webster | May 9, 1950 |
| 2,584,979 | Bassinger | Feb. 12, 1952 |
| 2,603,067 | Nissim | July 15, 1952 |